United States Patent [19]
Miller

[11] 3,735,769
[45] May 29, 1973

[54] METHOD FOR PUMPING OIL THROUGH TERRAIN CONTAINING PERMAFROST

[76] Inventor: Jack Miller, 618 Athol St., Whitby, Ontario, Canada

[22] Filed: Apr. 8, 1971

[21] Appl. No.: 132,384

[52] U.S. Cl................................137/13, 137/340
[51] Int. Cl..........................F17d 1/14, F16k 49/00
[58] Field of Search.................137/81.5, 2, 8, 13, 137/12, 14, 340; 138/114

[56] References Cited

UNITED STATES PATENTS

| | | | |
|---|---|---|---|
| 2,475,635 | 7/1949 | Parsons | 138/114 X |
| 3,620,236 | 11/1971 | Van Arsdale et al. | 137/13 |
| 3,099,993 | 8/1963 | Smith | 138/114 X |
| 3,110,754 | 11/1963 | Witort et al. | 138/114 X |
| 3,143,861 | 8/1964 | Dumas | 138/114 X |
| 3,169,576 | 2/1965 | Lee et al. | 138/114 X |
| 3,471,177 | 10/1969 | Garrett et al. | 138/114 X |
| 3,494,287 | 2/1970 | King et al. | 137/2 X |
| 3,537,514 | 11/1970 | Levedahl | 137/13 X |
| 3,600,104 | 8/1971 | King | 137/2 X |
| 3,625,258 | 12/1971 | Phelps | 138/115 |

*Primary Examiner*—Samuel Scott
*Attorney*—Rogers, Bereskin & Parr

[57] ABSTRACT

A method of pumping oil in the Arctic in which an oil pipeline is located inside a natural gas pipeline. The cold natural gas pipeline insulates the warm oil pipeline and prevents the latter from melting the permafrost. Alternatively, alternate slugs of oil and gas can be pumped through one pipeline or through two pipelines located side-by-side, the temperatures and volumes of the gas slugs being controlled so that the temperature at the exterior of the pipeline installation remains below 32° F.

6 Claims, 7 Drawing Figures

PATENTED MAY 29 1973　　　　　　　　　　　　　　　3,735,769

INVENTOR.
JACK MILLER

BY
Rogers, Bereskin, & Parr

METHOD FOR PUMPING OIL THROUGH TERRAIN CONTAINING PERMAFROST

This invention relates to a method and apparatus for pumping oil through terrain of the type which may contain permafrost.

Construction of oil pipelines in the Arctic has in the past been difficult because of the presence of permafrost (i.e. permanently frozen ground). The oil must be kept at a relatively warm temperature so that it can be pumped, and a warm pipeline melts the permafrost if it is placed in contact with the permafrost. Such melting of the supporting permafrost causes the oil pipeline to sink, invariably unevenly, and this causes the pipeline to rupture. In the past, this problem has been avoided by placing pipelines on stilts, but this is expensive and also creates a barrier which some types of wildlife will not cross. An alternative solution is to surround the pipeline with a mass of insulating material such as gravel, but again this is expensive, and gravel is often unobtainable in the Arctic, and in any event the insulation is usually imperfect.

Pipelines for natural gas have not encountered similar difficulty in the Arctic because the gas can be pumped at low temperatures.

The present invention enables an oil pipeline to be buried in the permafrost without any requirement for stilts, and without the need to surround the pipeline with large masses of insulating material such as gravel. In a preferred embodiment of the invention this is achieved by enclosing an oil pipeline in a gas pipeline, the oil being maintained at a temperature to facilitate its pumping, and the gas being maintained at a temperature below 32° F such that the temperature at the exterior of the pipeline does not rise above 32° F.

Variations of this method can also be employed, as explained in the following description, taken with the accompanying drawings, in which.

Figure 1:
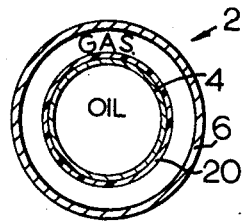
FIG. 1 is a sectional view showing a pipeline according to the invention.
Figure 2:
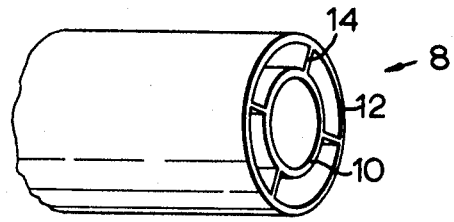
FIG. 2 is a perspective view of a collar for the pipeline of FIG. 1.

Reference is first made to FIG. 1, which shows a pipeline 2 according to the invention. The pipeline 2 includes an inner pipeline 4 for oil and an outer pipeline 6 for gas. The inner pipeline 4 is supported within the outer pipeline 6 by any desired means. Such means may for example comprise collars 8 (FIG. 2) having an inner ring 10 within which the inner pipeline 4 slidingly fits, and an outer ring 12 which fits slidingly within the outer pipeline 6. Struts 14 support the inner ring 10 on the outer ring 12. The collars 8 may be welded or otherwise secured to sections of the inner pipeline 4 before such sections are inserted in the outer pipelines 6. The collars 8 are of course designed to minimize interference with flow through the pipeline 6.

Figure 3:
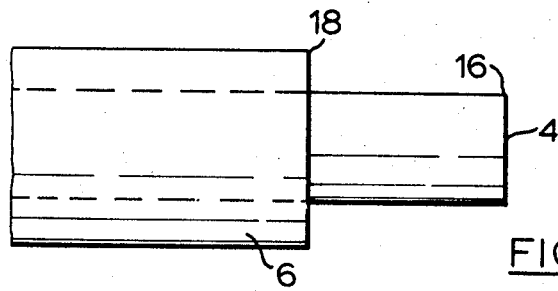
FIG. 3 is a side view of a portion of the FIG. 1 pipeline during assembly.

Typically the inner and outer pipeline sections are staggered, so that as shown in FIG. 3, the inner pipeline projects past the outer pipeline at the end at which the pipeline is being extended. This enables a section of inner pipeline to be welded to the end 16 of a built-up length and then a section of outer pipeline to be welded to the end 18 of the outer pipeline of the same length. Other methods of assembly may also be used.

The complete pipeline of FIG. 1 may be buried in the permafrost with little or no insulation. Oil is pumped through the inner pipeline 4 at a temperature dependant on the requirements of the oil and of the pumping stations, typically at about 50° F. Natural gas is pumped through the outer pipeline 6 at a much lower temperature, e.g., 10° F or lower. Such natural gas is usually readily available at oil fields. The invention thus not only provides for transport of the natural gas but also at the same time uses the natural gas to insulate the warm oil pipeline.

As the gas and oil travel along the pipeline, the gas will gradually be warmed by the oil, and the oil will gradually be cooled by the gas and by the cold ground in which the pipeline is buried. The rate of heat exchange between the gas and oil is preferably minimized by wrapping the inner pipeline 4 with a thin layer of insulation as indicated at 20 in FIG. 1. However, if insulation 20 is used, it is kept thin so as to reduce the capacity of the outer pipeline 6 as little as possible.

Figure 4:
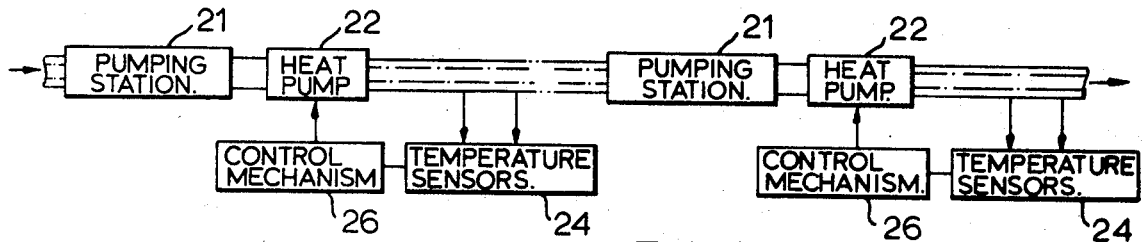
FIG. 4 is a diagrammatic view showing a pipeline system according to the invention including the pipeline of FIG. 1.

At spaced intervals along the route of the pipeline, pumping stations 21 (FIG. 4) are provided to maintain the flow of gas and oil. Heat pumps 22 are also provided at spaced intervals along the pipeline, normally at the locations of the pumping stations 21, to cool the gas if necessary and to maintain the temperature of the oil sufficiently high that it will flow. The heat pump installations include temperature sensors diagrammatically shown at 24 to monitor the temperature of the oil and gas and the ambient temperature, and a conventional control mechanism 26 which receives temperature indications from the sensors 24. The control mechanism 26 controls the heat pumps (which may include burners) to warm the oil to the required temperature and to cool the gas sufficiently that the temperature at the exterior of the pipeline will be below 32° F over the entire pipeline length between adjacent heat pumps 22. The distance between heat pumps 22 will depend on the relative sizes of the oil and gas pipelines and on the relative quantities and temperatures of oil and gas being pumped, as well as on the presence of any insulation between the pipelines and any insulation around the outer pipeline. The heat pumps and pumping stations may for example be 30 miles apart, but this distance can vary considerably.

The energy required by the pumping stations 21 which pressurize the gas and oil, and by the heat pumps 22 and their associated equipment, can be derived from natural gas in the pipeline 6. The natural gas can be used to generate electricity for the control mechanisms, pumps and compressors, and can be burned to provide heat for the oil. In addition, heat energy obtained from chilling the gas can be added to the oil. The availability of the natural gas will thus reduce the capital cost of the pumping and heat pump stations.

At the terminus of the pipeline 2, the oil and gas are separately collected and dealt with as required.

Figure 5:
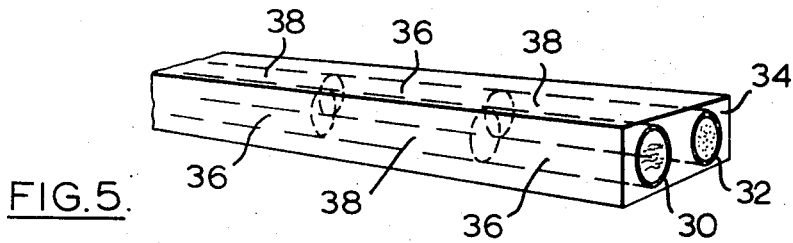
FIG. 5 is a perspective view, partly in section, showing another pipeline according to the invention.

Instead of placing one pipeline inside another, the arrangement shown in FIG. 5 can be used, in which two pipelines 30, 32 are placed side-by-side and surrounded by a relatively thin insulation casing 34 (which could include a thin gravel layer). Alternate slugs of oil 36 and natural gas 38 of substantial size are pumped through each pipeline 30, 32. Preferably while pipeline 30 is conducting oil, pipeline 34 conducts natural gas, and vice-versa, but exact correspondence is not essential. The temperatures and volumes of the natural gas are maintained such that the temperature at the exterior of the insulation casing 34 does not rise above 32° F. Pumping of the slugs of oil is carried out in well known manner, with the slugs of gas trapped between the slugs of oil, the two masses being kept discrete. As before, heat pumps and temperature sensors are provided at spaced intervals to chill the gas and warm the oil.

Figure 6:
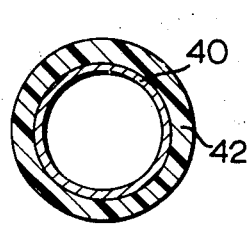
FIGS. 6 and 7 are sectional views showing further methods of pumping oil according to the invention.

As a third alternative, a single pipeline 40 (FIG. 6) may be used, enclosed in a relatively thin jacket of insulation 42. Alternate slugs of oil and gas are pumped through the pipeline 40, with the volumes and temperatures of the gas slugs being adjusted so that the temperature at the exterior of insulation 42 does not rise above 32° F. Again, heat pumps and temperature sensors are provided at spaced intervals along the pipeline to ensure proper temperature control. Sensing of ambient temperature will normally be carried out in addition to sensing of oil and gas temperature, because the rate at which the gas is warmed by the oil will vary depending on the temperature of the medium surrounding the pipeline. In cases where the pipeline is buried very shallowly, less chilling of the gas may be required during extremely cold weather than during the Arctic summer.

Figure 7:
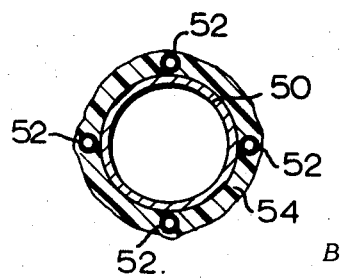

As a fourth alternative, an oil pipeline 50 (FIG. 7) can be equipped with several smaller gas pipelines 52 running beside it, and a layer of insulation 54 covering the composite pipeline. However, with such an arrangement, there is some danger of heat leakage between the gas pipelines, and also, a number of pipelines must be provided, creating more expense than (for example) the FIG. 6 arrangement.

What I claim is

1. A method of pumping oil from an oil field to a distant collection area through terrain of a type which may contain permafrost, comprising:
    a. pumping said oil through pipeline means,
    b. pumping natural gas through said pipeline means while maintaining said oil and gas separate in masses of substantial volume,
    c. and heating said oil to maintain its temperature above 32° F to facilitate flow of said oil while cooling said gas to maintain the temperature at the exterior of said pipeline means below 32° F, whereby to avoid melting said permafrost.

2. A method according to claim 1 wherein said oil is pumped in an inner pipeline and said gas is pumped in an outer pipeline enclosing said inner pipeline.

3. A method according to claim 1 wherein said step c. includes pumping heat from said gas to said oil at spaced intervals along said pipeline.

4. A method according to claim 1 wherein said step c. includes utilizing said natural gas to provide energy for pumping and heating said oil.

5. A method according to claim 1 wherein alternate slugs of oil and gas are pumped through said pipeline means.

6. A method according to claim 5 wherein said pipeline means comprises two pipelines side-by-side and alternate slugs of gas and oil are pumped through each pipeline, the gas and oil slugs of one pipeline being staggered with respect to the gas and oil slugs of the other pipeline.

* * * * *